United States Patent
Lohr et al.

(10) Patent No.: US 12,101,773 B2
(45) Date of Patent: Sep. 24, 2024

(54) BUFFER STATUS REPORT INDICATOR

(71) Applicant: LENOVO (BEIJING) LIMITED, Beijing (CN)

(72) Inventors: Joachim Lohr, Wiesbaden (DE); Lianhai Wu, Beijing (CN); Prateek Basu Mallick, Dreieich (DE)

(73) Assignee: Lenovo (Beijing) Limited, Beijing (CN)

( * ) Notice: Subject to any disclaimer, the term of this patent is extended or adjusted under 35 U.S.C. 154(b) by 687 days.

(21) Appl. No.: 17/278,572

(22) PCT Filed: Nov. 1, 2018

(86) PCT No.: PCT/CN2018/113469
§ 371 (c)(1),
(2) Date: Mar. 22, 2021

(87) PCT Pub. No.: WO2020/087452
PCT Pub. Date: May 7, 2020

(65) Prior Publication Data
US 2021/0352700 A1    Nov. 11, 2021

(51) Int. Cl.
*H04W 4/00*    (2018.01)
*H04W 28/02*    (2009.01)
(Continued)

(52) U.S. Cl.
CPC ....... *H04W 72/21* (2023.01); *H04W 28/0278* (2013.01); *H04W 72/1263* (2013.01);
(Continued)

(58) Field of Classification Search
CPC ......... H04W 72/1284; H04W 72/1263; H04W 28/0278; H04W 72/14; H04W 88/14; H04W 80/02; H04W 72/1268
(Continued)

(56) References Cited

U.S. PATENT DOCUMENTS 8,594,031 B2 * 11/2013 Nguyen ................ H04W 72/56
                                                         370/468
11,612,003 B2 * 3/2023 Babaei ................ H04W 72/543
(Continued)

FOREIGN PATENT DOCUMENTS

EP    2567589 A1    3/2013
WO    2018018472 A1    2/2018

OTHER PUBLICATIONS

International Searching Authority, "Notification of Transmittal of the International Search Report and the Written Opinion of the International Searching Authority, or the Declaration", PCT/CN2018/113469, Nov. 1, 2018, pp. 1-6.
(Continued)

*Primary Examiner* — Marceau Milord
(74) *Attorney, Agent, or Firm* — Kunzler Bean & Adamson

(57) ABSTRACT

Apparatuses, methods, and systems are disclosed for transmitting and/or receiving a buffer status report indicator. One method (800) includes determining (802), at a medium access control entity of a backhaul node, a buffer status report including an indicator indicating that the buffer status report corresponds to uplink data that is expected to arrive at the backhaul node. The method (800) includes transmitting (804) the buffer status report.

14 Claims, 9 Drawing Sheets

(51) Int. Cl.
*H04W 72/1263* (2023.01)
*H04W 72/21* (2023.01)
*H04W 72/23* (2023.01)
*H04W 80/02* (2009.01)
*H04W 88/14* (2009.01)

(52) U.S. Cl.
CPC .......... *H04W 72/23* (2023.01); *H04W 80/02* (2013.01); *H04W 88/14* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2009/0196477 | A1 | 8/2009 | Cense et al. | |
| 2010/0103863 | A1* | 4/2010 | Ulupinar | H04L 61/50 370/329 |
| 2011/0205980 | A1* | 8/2011 | Prakash | H04W 28/26 370/329 |
| 2017/0310433 | A1* | 10/2017 | Dinan | H04L 5/0053 |
| 2017/0311317 | A1* | 10/2017 | Dinan | H04W 72/52 |
| 2017/0332275 | A1* | 11/2017 | Yi | H04W 72/21 |
| 2018/0041410 | A1* | 2/2018 | Yi | H04W 28/0278 |
| 2018/0084450 | A1* | 3/2018 | Lee | H04W 24/02 |
| 2018/0199354 | A1* | 7/2018 | Yi | H04W 28/02 |
| 2018/0234524 | A1* | 8/2018 | Cheng | H04W 76/15 |
| 2018/0270839 | A1* | 9/2018 | Loehr | H04W 72/0446 |
| 2018/0332580 | A1* | 11/2018 | Dinan | H04L 5/0053 |
| 2018/0368159 | A1* | 12/2018 | Wu | H04W 72/21 |
| 2019/0254059 | A1* | 8/2019 | Gulati | H04W 72/542 |
| 2020/0037190 | A1* | 1/2020 | Wu | H04W 28/0278 |
| 2020/0107356 | A1* | 4/2020 | Rico Alvarino | H04W 72/21 |
| 2020/0112927 | A1* | 4/2020 | Han | H04W 52/365 |
| 2020/0137745 | A1* | 4/2020 | Bachu | H04L 5/001 |
| 2021/0051738 | A1* | 2/2021 | Babaei | H04L 5/0094 |

OTHER PUBLICATIONS

Huawei, Hisilicon, Pre-BSR Enabling Fast Scheduling, 3GPP TSG-RAN WG2 Meeting 103bis, R2-1815504, Oct. 8-12, 2018, pp. 1-3, Chengdu, China.

Ericsson, Uplink Scheduling in IAB Networks, 3GPP TSG-RAN WG2 Meeting #103b, R2-1814365, Oct. 8-12, 2018, pp. 1-6, Chengdu, P.R. China.

ETRI, Discussions on Buffer Status Report over Un interface, 3GPP TSG RAN WG2 #69bis, R2-102252, Apr. 12-16, 2010, pp. 1-3, Beijing, China.

* cited by examiner

BUFFER STATUS REPORT INDICATOR

FIELD

The subject matter disclosed herein relates generally to wireless communications and more particularly relates to a buffer status report indicator.

BACKGROUND

The following abbreviations are herewith defined, at least some of which are referred to within the following description: Third Generation Partnership Project ("3GPP"), Acknowledge Mode ("AM"), Backhaul ("BH"), Broadcast Multicast ("BM"), Buffer Occupancy ("BO"), Base Station ("BS"), Buffer Status Report ("BSR"), Bandwidth Part ("BWP"), Component Carrier ("CC"), Coordinated Multipoint ("CoMP"), Control Plane ("CP"), CSI-RS Resource Indicator ("CRI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Group ("LCG"), Logical Channel ID ("LCID"), Logical Channel Prioritization ("LCP"), Long Term Evolution ("LTE"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), Packet Switched ("PS"), Quasi Co-Located ("QCL"), Quality of Service ("QoS"), Radio Access Network ("RAN"), Radio Access Technology ("RAT"), Resource Element ("RE"), Rank Indicator ("RI"), Radio Link Failure ("RLF"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Service Data Unit ("SDU"), Subscriber Identity Module ("SIM"), Signal-to-Interference and Noise Ratio ("SINR"), Sequence Number ("SN"), Scheduling Request ("SR"), Synchronization Signal ("SS"), SS/PBCH Block ("SSB"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Voice Over IP ("VoIP"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, buffer status reports may be sent. In such networks, different types of buffer status reports may be sent.

BRIEF SUMMARY

Methods for transmitting a buffer status report indicator are disclosed. Apparatuses and systems also perform the functions of the apparatus. In one embodiment, the method includes determining, at a medium access control entity of a backhaul node, a buffer status report including an indicator indicating that the buffer status report corresponds to uplink data that is expected to arrive at the backhaul node. In certain embodiments, the method includes transmitting the buffer status report.

An apparatus for transmitting a buffer status report indicator, in one embodiment, includes a processor of a medium access control entity that determines a buffer status report including an indicator indicating that the buffer status report corresponds to uplink data that is expected to arrive at the apparatus. In various embodiments, the apparatus includes a transmitter that transmits the buffer status report.

A method for receiving a buffer status report indicator includes receiving a buffer status report including an indicator indicating that the buffer status report corresponds to uplink data that is expected to arrive at a backhaul node.

An apparatus for receiving a buffer status report indicator, in one embodiment, includes a receiver that receives a buffer status report including an indicator indicating that the buffer status report corresponds to uplink data that is expected to arrive at a backhaul node.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
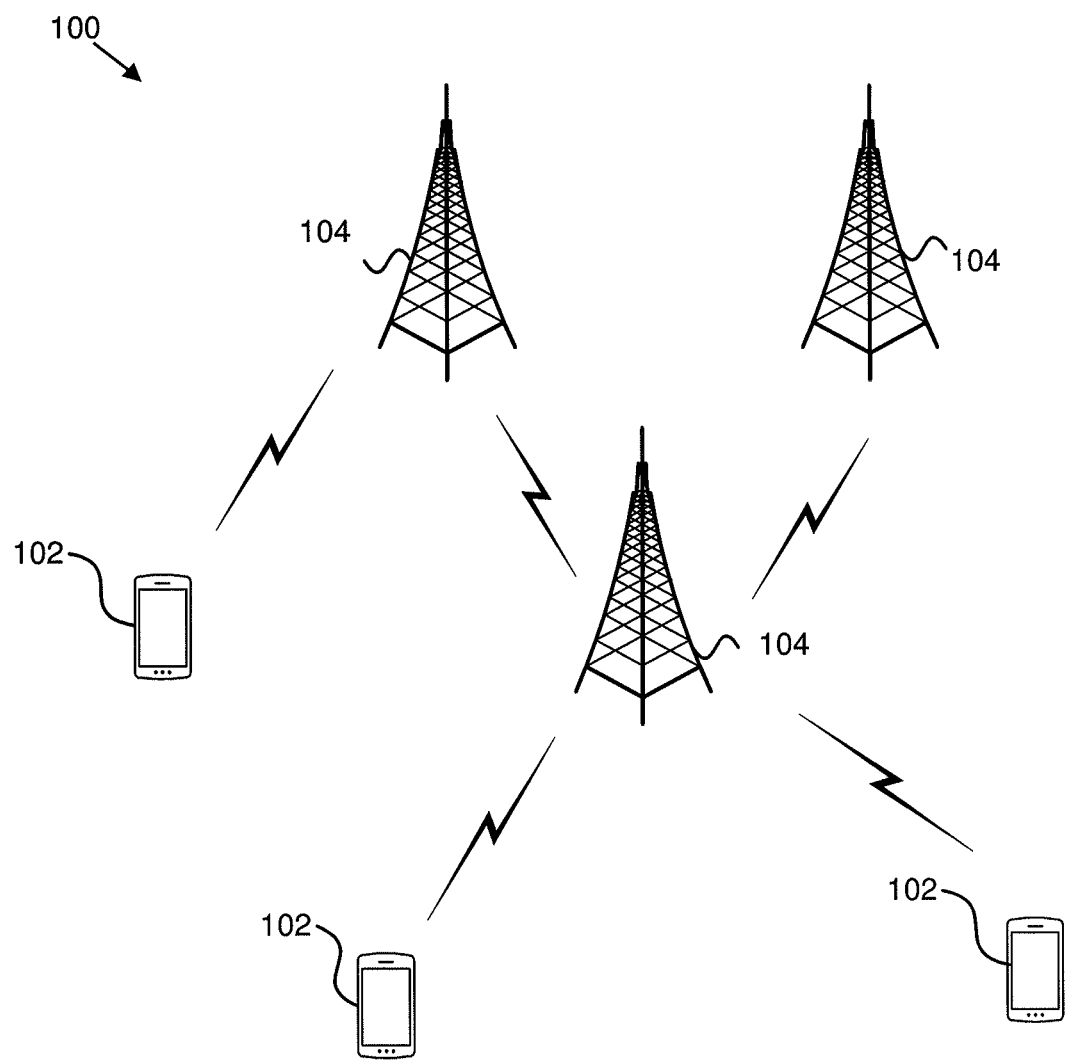
FIG. 1 is a schematic block diagram illustrating one embodiment of a wireless communication system for transmitting and/or receiving a buffer status report indicator.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving a buffer status report indicator. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may determine, at a medium access control entity of the network unit 104, a buffer status report including an indicator indicating that the buffer status report corresponds to uplink data that is expected to arrive at the backhaul node. In certain embodiments, the network unit 104 may transmit the buffer status report. Accordingly, a network unit 104 may be used for transmitting a buffer status report indicator.

In some embodiments, a network unit 104 may receive a buffer status report including an indicator indicating that the buffer status report corresponds to uplink data that is expected to arrive at a backhaul node. Accordingly, a network unit 104 may be used for receiving a buffer status report indicator.

Figure 2:
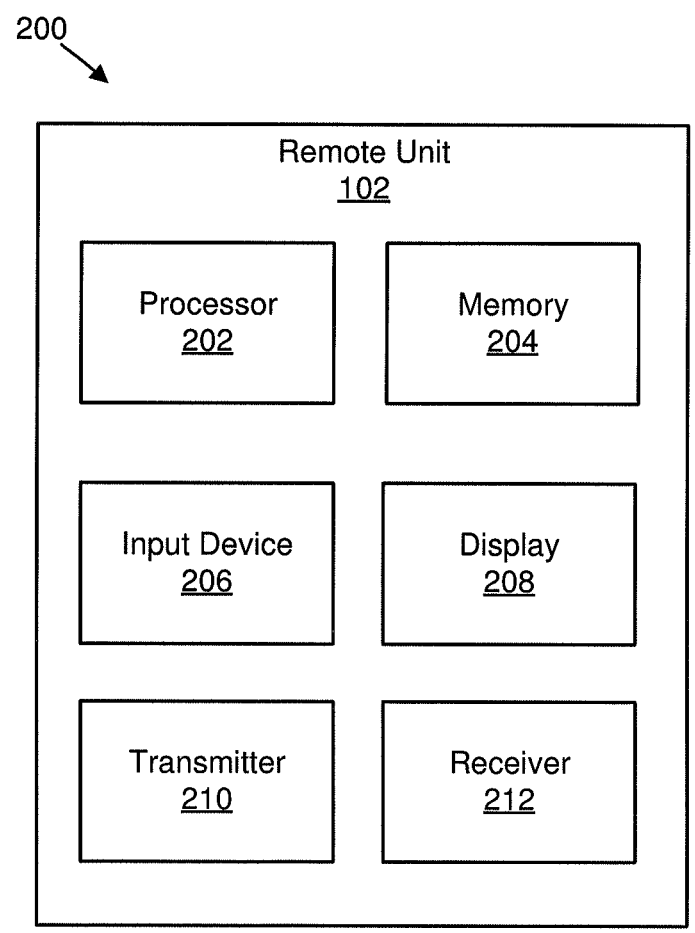
FIG. 2 is a schematic block diagram illustrating one embodiment of an apparatus that may be used for communications.

FIG. 2 depicts one embodiment of an apparatus 200 that may be used for communications. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
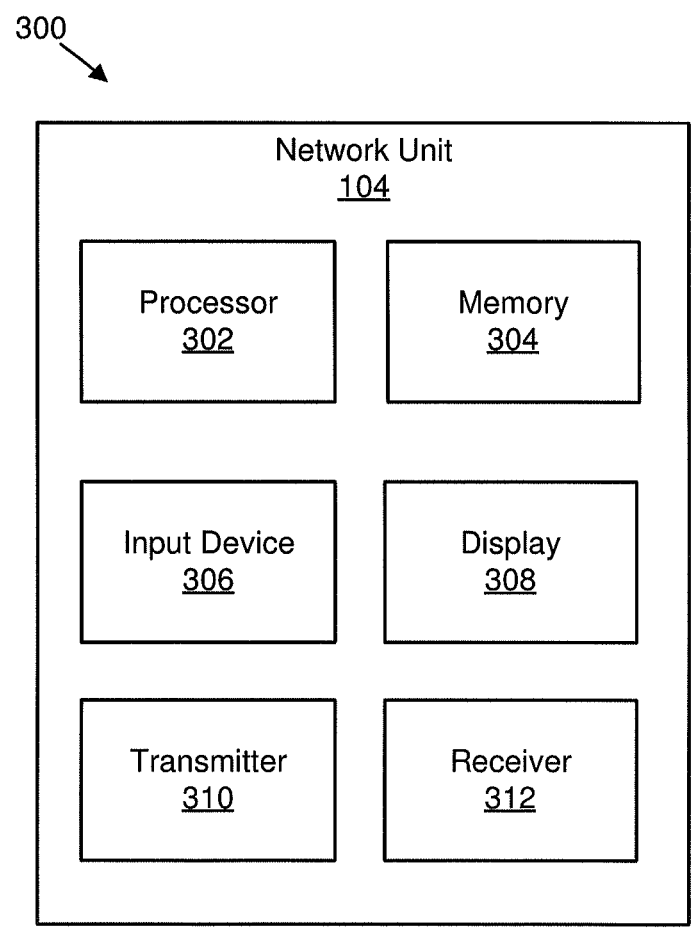
FIG. 3 is a schematic block diagram illustrating one embodiment of an apparatus that may be used for transmitting and/or receiving a buffer status report indicator.

FIG. 3 depicts one embodiment of an apparatus 300 that may be used for transmitting and/or receiving a buffer status report indicator. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the processor 302 of a medium access control entity determines a buffer status report including an indicator indicating that the buffer status report corresponds to uplink data that is expected to arrive at the apparatus. In certain embodiments, the transmitter 310 transmits the buffer status report.

In some embodiments, the receiver 312 receives a buffer status report including an indicator indicating that the buffer status report corresponds to uplink data that is expected to arrive at a backhaul node.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
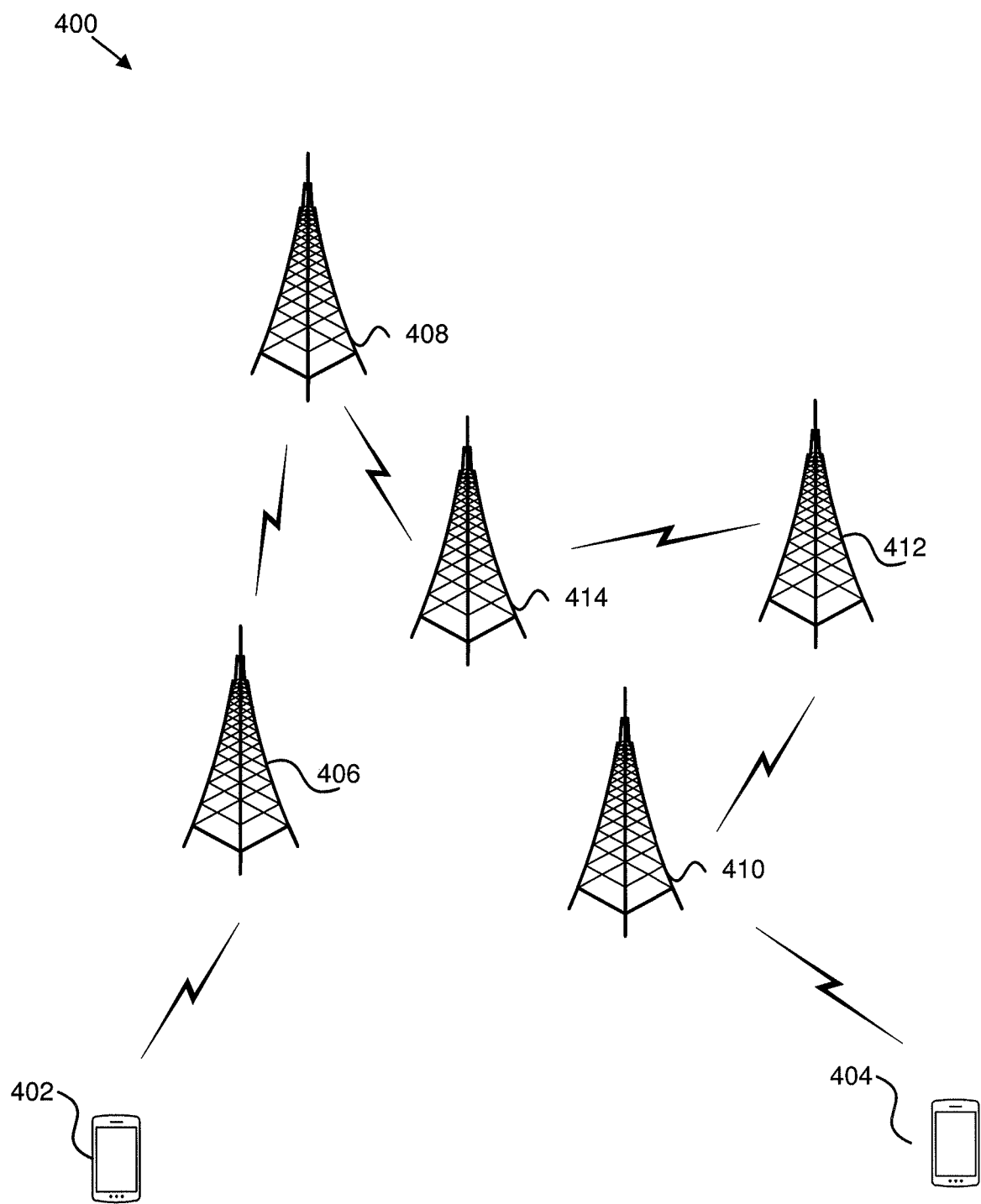
FIG. 4 is a schematic block diagram illustrating one embodiment of an integrated access backhaul system.

FIG. 4 is a schematic block diagram illustrating one embodiment of an integrated access backhaul ("IAB") system 400. The IAB system 400 includes a first UE 402, a second UE 404, a first IAB node 406, an IAB donor node 408, a second IAB node 410, a third IAB node 412, and a fourth IAB node 414. As illustrated, the first UE 402 is connected to the IAB donor node 408 via the first IAB node 406. Moreover, the second UE 404 is connected to the IAB donor node 408 via the second IAB node 410, the third IAB node 412, and the fourth IAB node 414. The IAB system 400, as illustrated, may be used for multi-hop backhauling via multiple IAB nodes.

As may be appreciated, multi-hop backhauling systems may provide a larger range extension than single hop systems. This may especially be beneficial for frequencies above 6 GHz due to a limited range of such frequencies. In some configurations, multi-hop backhauling enables backhauling around obstacles (e.g., buildings).

A maximum number of hops in a deployment may depend on many factors such as frequency, cell density, propagation environment, and traffic load. Thus, flexibility in hop count may be desirable. With an increased number of hops, scalability issues may arise, performance may be limited, and/or signaling load may increase signaling load to undesirable levels.

As may be appreciated, wireless backhaul links may be vulnerable to blockage (e.g., due to moving objects such as vehicles, due to seasonal changes (foliage), due to infrastructure changes (new buildings), and so forth). Such vulnerability may also apply to physically stationary IAB-nodes. In FIG. 4, the first UE 402 may switch from communicating via the first IAB node 406 to communicating with the second IAB node 410 if a backhaul link is blocked by objects (e.g., moving objects). Moreover, traffic variations may create uneven load distribution on wireless backhaul links leading to local link congestion and/or node congestion.

In some embodiments, an IAB node may include MT and DU. The MT function may be a component of a mobile equipment, or, as used herein, MT may be a function residing on an IAB node that terminates radio interface layers of a backhaul Uu interface toward the IAB-donor or other IAB nodes.

In various embodiments, a gNB may include a gNB-CU and one or more gNB-DUs. Moreover, a gNB-CU and a gNB-DU may be connected via an F1 interface. A gNB-CU may be a gNB central unit that is a logical node hosting RRC, SDAP, and PDCP protocols of the gNB. Furthermore, a gNB-DU may be a gNB distributed unit that is a logical node hosting RLC, MAC, and PHY layers of the gNB. In some embodiments, one cell is supported by only one gNB-DU.

In FIG. 4 the IAB nodes may be in a standalone mode which includes one IAB-donor and multiple IAB-nodes. The IAB-donor node 408 may be treated as a single logical node that includes a set of functions such as gNB-DU, gNB-CU-CP, gNB-CU-UP and potentially other functions. In certain embodiments, the IAB-donor node 408 may be split according to its functions which can all be either collocated or non-collocated as allowed by 3GPP NG-RAN architecture.

In some embodiments, an IAB node may multiplex UE DRBs to BH RLC-channels. Various options may be considered for bearer mapping in an IAB node as illustrated in FIGS. 5 and 6.

Figure 5:
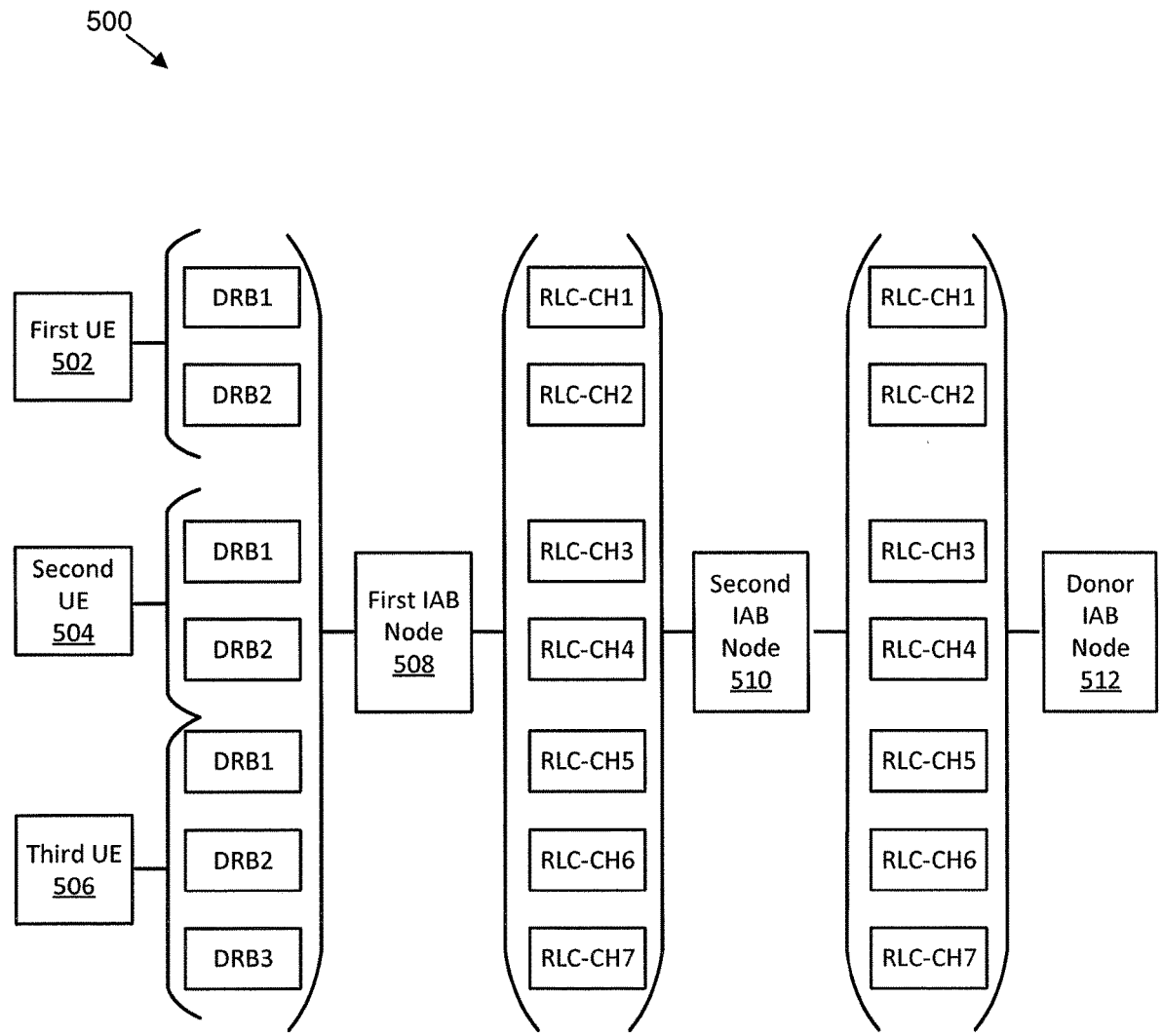
FIG. 5 is a schematic block diagram illustrating one embodiment of a system using one-to-one mapping.
Figure 6:
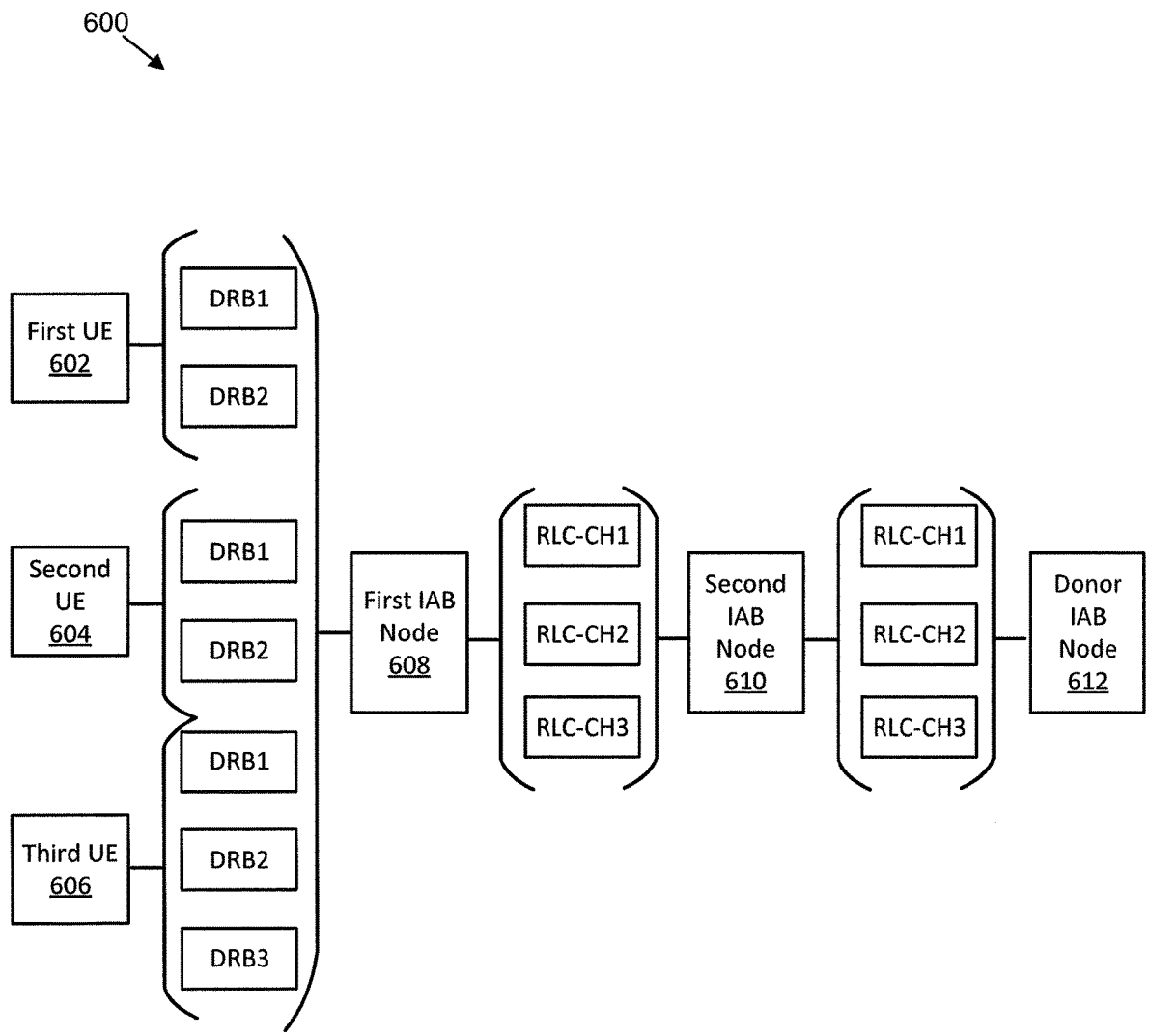
FIG. 6 is a schematic block diagram illustrating one embodiment of a system using many-to-one mapping.

FIG. 5 is a schematic block diagram illustrating one embodiment of a system 500 using one-to-one mapping. The system 500 includes a first UE 502 (e.g., UE1), a second UE 504 (e.g., UE2), a third UE 506 (e.g., UE3), a first IAB node 508, a second IAB node 510, and a donor IAB node 512. In this one-to-one mapping between UE DRBs and BH RLC-channels, each DRB from the UEs is mapped to a separate RLC channel. For example, DRB1 (e.g., VoIP) corresponding to the first UE 502 may be mapped to RLC-CH1 (e.g., RLC-Channel 1=UE1 DRB1), DRB2 (e.g., streaming) corresponding to the first UE 502 may be mapped to RLC-CH2 (e.g., RLC-Channel 2=UE1 DRB2), DRB1 (e.g., VoIP) corresponding to the second UE 504 may be mapped to RLC-CH3 (e.g., RLC-Channel 3=UE2 DRB1), DRB2 (e.g., web browsing) corresponding to the second UE 504 may be mapped to RLC-CH4 (e.g., RLC-Channel 4=UE2 DRB2), DRB1 (e.g., VoIP) corresponding to the third UE 506 may be mapped to RLC-CH5 (e.g., RLC-Channel 5=UE3 DRB1), DRB2 (e.g., web browsing) corresponding to the third UE 506 may be mapped to RLC-CH6 (e.g., RLC-Channel 6=UE3 DRB2), and DRB3 (e.g., streaming) corresponding to the third UE 506 may be mapped to RLC-CH7 (e.g., RLC-Channel 7=UE3 DRB3).

In this embodiment, each UE DRB is mapped onto a separate BH RLC-channel. Furthermore, each BH RLC-channel is mapped onto a separate BH RLC-channel on a next hop (e.g., from the second IAB node 510 to the donor IAB node 512). Accordingly, the number of established BH RLC-channels is equal to the number of established UE DRBs.

In some embodiments, a BH RLC channel may be mapped onto BH LCH. The mapping association can include: one BH RLC-channel mapped onto one BH LCH; or multiple BH RLC-channels mapped onto one BH LCH.

FIG. 6 is a schematic block diagram illustrating one embodiment of a system 600 using many-to-one mapping. The system 600 includes a first UE 602 (e.g., UE1), a second UE 604 (e.g., UE2), a third UE 606 (e.g., UE3), a first IAB node 608, a second IAB node 610, and a donor IAB node 612. In this many-to-one mapping between UE DRBs and BH RLC-channels, many DRB from the UEs are mapped to one RLC channel. For example, DRB1 (e.g., VoIP) corresponding to the first UE 602, DRB1 (e.g., VoIP) corresponding to the second UE 604, and DRB1 (e.g., VoIP) corresponding to the third UE 606 may all be mapped to RLC-CH1 (e.g., RLC-Channel 1=UE1 DRB1+UE2 DRB1+UE3 DRB1), DRB2 (e.g., streaming) corresponding to the first UE 602 and DRB3 (e.g., streaming) corresponding to the third UE 606 may both be mapped to RLC-CH2 (e.g., RLC-Channel 2=UE1 DRB2+UE3 DRB3), and DRB2 (e.g., web browsing) corresponding to the second UE 604 and DRB2 (e.g., web browsing) corresponding to the third UE 606 may both be mapped to RLC-CH3 (e.g., RLC-Channel 3=UE2 DRB2+UE3 DRB2).

Thus, for the many-to-one mapping, several UE DRBs are multiplexed onto a single BH RLC-channel based on specific parameters such as a bearer QoS profile. Other information such as hop-count may also be configured. In some embodiments, the IAB node may multiplex UE DRBs into a single BH RLC-channel even if they belong to different UEs. Furthermore, a packet from one BH RLC-channel may be mapped onto a different BH RLC-Channel on the next hop.

Because a BH RLC-channel multiplexes data from and/or to multiple bearers, and possibly even different UEs, each data block transmitted in a BH RLC-channel may contain an identifier of the UE, DRB, and/or IAB node it is associated with.

Furthermore, in some embodiments, BH RLC channels may be mapped onto a BH LCH in a MAC layer. There may be several mapping options for this. In one embodiment, a one-to-one mapping is established between BH RLC channels and BH LCHs. In another embodiment, several BH RLC channels may be mapped to one LCH.

In certain embodiments, multi-hop backhauling may have increased latency due to multiple hops in the IAB network that may adversely impact performance of control plane procedures (e.g., handover and radio link recovery) and user plane data transmission. To facilitate hop agnostic performance in IAB scheduling, a delay from a UE to an IAB donor may be reduced to meet latency requirements regardless of how many hops the UE is away from the IAB donor.

In various embodiments, in multi-hop networks, upstream data arriving from a child node may suffer scheduling delays at a parent node and/or intermediate nodes. The delays may accumulate due to a number of hops and an aggregated volume of data at IAB nodes. One embodiment of a request for uplink resources at each hop and UL data transmission is illustrated in FIG. 7.

Figure 7:
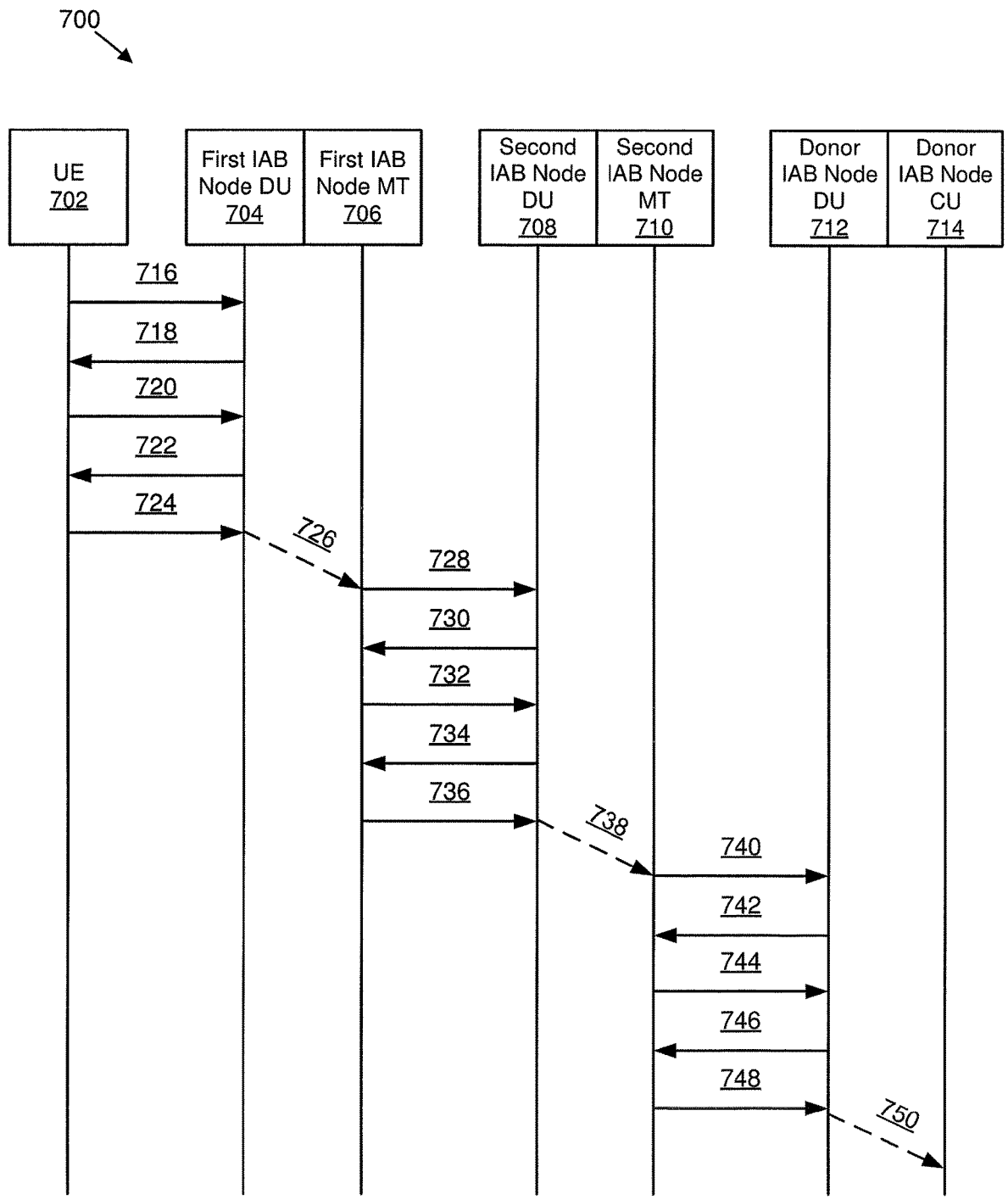
FIG. 7 is a schematic flow chart diagram illustrating one embodiment of a system having uplink delays.

Specifically, FIG. 7 is a schematic flow chart diagram illustrating one embodiment of a system 700 having uplink delays. The system 700 includes a UE 702, a first IAB node DU 704, a first IAB node MT 706, a second IAB node DU 708, a second IAB node MT 710, a donor IAB node DU 712, and a donor IAB node CU 714. A set of communications for data transmission between the UE 702 and the first IAB node DU 704 may include: a scheduling request 716; a first UL grant 718; a buffer status report 720; a second UL grant 722; and a protocol data unit 724. The first IAB node DU 704 may then communicate 726 information and/or data to the first IAB node MT 706.

A set of communications for data transmission between the first IAB node MT 706 and the second IAB node DU 708 may include: a scheduling request 728; a first UL grant 730; a buffer status report 732; a second UL grant 734; and a protocol data unit 736. The second IAB node DU 708 may then communicate 738 information and/or data to the second IAB node MT 710. A set of communications for data transmission between the second IAB node MT 710 and the donor IAB node DU 712 may include: a scheduling request 740; a first UL grant 742; a buffer status report 744; a second UL grant 746; and a protocol data unit 748. The donor IAB node DU 712 may then communicate 750 information and/or data to the donor IAB node CU 714.

As may be appreciated, the communication process illustrated in FIG. 7 may be significantly longer than a corresponding process in one-hop networks due to the multiple consecutive uplink resource request and allocation steps. One reason for these delays is that the MT part of an IAB node can only request uplink resources for UL data transmission after it actually receives the data to be transmitted.

In various embodiments, to avoid and/or reduce such delays an uplink resource request may be initiated at an IAB node based on data that is expected to arrive. For example, an IAB node may request uplink resources to its parent IAB node based on a received buffer status report from its child IAB node. This would enable the IAB node to obtain the uplink resource prior to actual data reception from its child IAB node. As used herein, triggering and/or sending a BSR upon reception of a BSR from a child IAB node and before the reception of actual data may be referred to as triggering and/or sending an "early BSR." Furthermore, it should be noted that the term "early BSR" is used herein to denote a buffer status report indicating uplink data that is expected to be received in contrast to a legacy buffer status report that indicates data that is actually available (e.g., at an MAC entity) for transmission.

In certain embodiments, because a BSR is reported per LCG (e.g., not per LCH), information of a received buffer status report from a child IAB node may only be useful if IAB nodes have the same configuration (e.g., LCH to LCG mapping). If the IAB nodes did not have the same configuration, buffer status information conveyed in an early BSR to a parent node (e.g., based on a received BSR from a child IAB node) may not be correct.

In some embodiments, it may be ensured that at a time of sending an early BSR to a parent IAB node (e.g., based on a received BSR from a child IAB node), an UL resource allocation from the parent IAB node doesn't occur too early (e.g., before the data has been actually received from the child IAB node). In such embodiments, HARQ and/or scheduling delays may also be considered.

In one embodiment, an IAB node may be provided with information about buffer status related configurations of other intermediate IAB nodes in a multi-hop IAB system. In such embodiments, the buffer status related configurations may include one or more LCH to LCG mappings and/or one or more bearer to backhaul channel mappings. In some embodiments, because an IAB node receiving an early BSR from its child IAB node (e.g., which itself was triggering and/or sending the early BSR based on a received BSR from its child IAB node) should be able to interpret the received early BSR correctly in order to give adequate UL resource allocations, the IAB node should be aware of buffer status reporting related configurations of its downstream IAB nodes. According to certain embodiments, an IAB node is configured with the information about one or more LCH to LCG mappings and/or one or more bearer to BH channel mappings of downstream IAB nodes (e.g., in FIG. 4 the fourth IAB node 414 is informed about BSR related configurations of the third IAB node 412 and the second IAB node 410). In various embodiments, configuration information may be provided by a donor IAB node that is also responsible for the configurations of intermediate IAB nodes.

In some embodiments, an IAB node may be configured by control signaling that indicates whether the IAB node is allowed to trigger and/or send an early BSR (e.g., based on a received BSR from its child IAB node or based on a received BSR from UEs which are directly attached to it). In various embodiments, the control signaling may be signaled by a donor IAB node. In certain embodiments, the signaling may be part of MAC related configurations (e.g., BSR and/or SR related configurations).

In one embodiment, a MAC entity of an IAB node may only be allowed to trigger and/or send an early BSR based on reception of a BSR from its child IAB node or an attached UE if the buffer status related configurations (e.g., one or more LCH-LCG mappings and/or one or more bearer to BH channel mappings) are the same for a DU part and a MT part of the IAB node. In some embodiments, a MAC entity of an IAB node may only be allowed to trigger and/or send an early BSR if one or more LCH-to-LCG mappings and/or one or more bearer to BH channel mappings are the same between the IAB node and its child IAB node and between the IAB node and its parent IAB node (e.g., transmissions on a Uu interface between the IAB node and its child IAB node, and the IAB node and its parent IAB node). As used herein, a Uu interface is a communication interface between an IAB node and its parent IAB node or its child IAB node. Taking FIG. 7 as an example, the first IAB node (that includes 704 and 706) is only allowed to trigger and/or send an early BSR if the configurations related to BSR reporting are the same for uplink transmissions between the second IAB node (that includes 708 and 710) and the first IAB node and between the first IAB node and the donor IAB node (that includes 712 and 714). In certain embodiments, a decision about whether to trigger and/or send an early BSR may be done by an IAB node autonomously (e.g., no control signaling and/or configuration may be transmitted by some other network entity). For example, an IAB node may determine whether it is able to trigger and/or send an early BSR based on its configuration, its child IAB node configuration, a corresponding UE configuration, and/or its parent IAB node.

In certain embodiments, an early BSR reports data received in a legacy BSR MAC CE from a child IAB node. In such embodiments, in addition to the buffer status reported in a received legacy BSR, an early BSR may also indicate data reported in legacy BSRs from UEs attached to the IAB node as well as data which may be already stored in transmission buffers of the IAB node. In some embodiments, an early BSR reports only data of predefined LCGs which are expected to be received. Those predefined LCGs (e.g., a donor IAB node may configure the LCGs to report in an early BSR) may be LCGs containing high priority LCHs.

In various embodiments, an early BSR may be conveyed in a MAC CE which has a different MAC CE format than a legacy BSR MAC CE (e.g., different from a long BSR MAC CE format, a short BSR MAC CE format, a long truncated BSR MAC CE format, and/or a short truncated BSR MAC CE format as defined in TS38.321). The different MAC CE format for the early BSR may enable reporting a buffer status with a different granularity compared to a legacy BSR MAC CE. In one embodiment, an early BSR may indicate a total amount of data across all LCGs reported in a received BSR from a child IAB node as data available for transmission. In certain embodiments, an early BSR MAC CE may be identified by a new reserved logical channel ID.

In some embodiments, an early BSR may be a new type of BSR MAC CE defined in a specification that is in addition to BSR formats that already exist. BSR formats that already exist may include a long BSR MAC CE format, a short BSR MAC CE format, a long truncated BSR MAC CE format, and/or a short truncated BSR MAC CE format. The new BSR format (e.g., referred to as an early BSR) may be identified by a new reserved LCID. As may be appreciated, introducing the early BSR as a new type of BSR MAC CE (e.g., identified by a new reserved LCID) may enable an IAB node to unambiguously identify a received BSR as an early BSR (e.g., a BSR that was triggered based on data that is expected to arrive not based on data arrival). This new type of BSR MAC CE may facilitate avoiding conditions in which a parent IAB node allocates UL resources (e.g., based on a received BSR) too soon before an IAB node receives the data from its child node. Thus, by enabling an IAB node to distinguish a legacy BSR (e.g., triggered based on actual data in a transmission buffer) from an early BSR (e.g., triggered based on data expected to be received), wasting UL resources may be reduced. The new type of BSR MAC CE may be implemented in any suitable manner.

In one embodiment, a BSR procedure may be used to provide a serving gNB with information about UL data volume in a MAC entity. In certain embodiments, RRC may configure the following parameters to control a BSR: periodicBSR-Timer; retxBSR-Timer; logicalChannelSR-DelayTimerApplied; logicalChannelSR-DelayTimer; logicalChannelSR-Mask; and/or logicalChannelGroup. In such embodiments, each logical channel may be allocated to an LCG using a logicalChannelGroup parameter. Moreover, in such embodiments, a maximum number of LCGs may be eight. In some embodiments, a MAC entity may determine an amount of UL data available for a logical channel according to a data volume calculation procedure, such as a procedure defined in TSs 38.322 and 38.323.

In some embodiments, a BSR may be triggered if any of the following events occur: the MAC entity has new UL data available for a logical channel which belongs to an LCG; and either: the new UL data belongs to a logical channel with higher priority than the priority of any logical channel containing available UL data which belong to any LCG; or none of the logical channels which belong to an LCG contains any available UL data. In such embodiments, the BSR may be referred to as 'Regular BSR.' In various embodiments, UL resources are allocated, and a number of padding bits is equal to or larger than a size of a BSR MAC CE plus its subheader, in which case the BSR is referred to as 'Padding BSR.' In certain embodiments, a retxBSR-Timer expires, and at least one of the logical channels that belong to a LCG contains UL data, in which case the BSR is referred to as a 'Regular BSR.' In some embodiments, a periodicBSR-Timer expires, in which case the BSR is referred to as a 'Periodic BSR.' In various embodiments, a BSR MAC CE is received and early BSR reporting is configured for a MAC entity and/or UE, in which case the BSR is referred to as an 'early BSR.'

In certain embodiments, a BSR MAC CE is one of: a short BSR format (e.g., fixed size); a long BSR format (e.g., variable size); a short truncated BSR format (e.g., fixed size); a long truncated BSR format (e.g., variable size); or an early BSR format (e.g., variable size). In some embodiments, BSR formats are identified by MAC PDU subheaders with LCIDs.

In various embodiments, a MAC entity of an IAB node is only allowed to trigger and/or send an early BSR (e.g., BSR trigger based on data expected to be received) if the IAB node has already allocated UL resources to its child IAB node and/or UE for the transmission of the data which is indicated in the early BSR. As may be appreciated, by delaying the triggering and/or sending of an early BSR until a point in time in which UL resources have been allocated, a risk that a parent IAB node provides UL resources based on a received early BSR before actual data has been received at the IAB node is reduced.

In certain embodiments, an early BSR may not trigger another early BSR. To facilitate avoiding and/or reducing uplink scheduling delays in a multi-hop IAB system, an IAB node may initiate an uplink resource request based on data that is expected to arrive. For example, an IAB node may send a request for uplink resources to its parent IAB node based on a received buffer status report from its child IAB node. However, an IAB node may only be allowed to request uplink resources from its parent IAB node (e.g., trigger an early BSR) if the IAB node has received a legacy buffer status report (e.g., not an early BSR). Thus, an IAB node may not be allowed to request uplink resources from its parent IAB node (e.g., trigger an early BSR) based on the reception of an early BSR. In some embodiments, an IAB node is only allowed to trigger and/or send an early BSR based on a received regular BSR (e.g., not an early BSR).

In various embodiments, to enable efficient scheduling of uplink transmissions by having a closer match of uplink transmission parameters (e.g., including numerology and PUSCH transmission duration) for PUSCH transmission to LCH requirements, there may be an early indication to a gNB of a type of traffic on LCHs triggering a SR using multiple single-bit SR configurations. In some embodiments, a MAC entity may be configured with zero, one, or more SR configurations. In certain embodiments, an SR configuration may include a set of PUCCH resources for SR across different BWPs and serving cells. In one embodiment, for a radio bearer and/or logical channel, at most one PUCCH resource for dedicated SR is configured per BWP. In various embodiments, each radio bearer and/or logical channel may be mapped to zero or one SR configuration that is configured by RRC signaling. In embodiments in which a radio bearer and/or logical channel has no SR configuration, a device may initiate a RACH procedure if a BSR is triggered due to data arrival in the radio bearer and/or the logical channel.

In some embodiments, a MAC entity of an IAB node may consider the logical channel that triggered an early BSR as the highest priority logical channel among logical channels belonging to an LCG that is expected to have data available for transmission (e.g., based on a received BSR) at a time the early BSR is triggered. For example, if a received BSR at an IAB node (e.g., from a child IAB node and/or UE) indicates that there is data available for transmission in LCG #1, LCG #2 and LCG #3, then the IAB node may consider that the highest priority logical channel among the logical channels mapped to LCG #1, LCG #2 and LCG #3 is the logical channel triggering the early BSR for the purpose of SR triggering and/or sending (e.g., determining on which PUCCH resource a SR for an triggered early BSR is sent).

In certain embodiments, a predefined SR configuration (e.g., PUCCH resource) is used for transmission of an SR triggered by an early BSR.

In various embodiments, a triggered early BSR may not be cancelled if UL grants can accommodate all pending data available for transmission but is not sufficient to additionally accommodate a BSR MAC CE plus its subheader. In such embodiments, the early BSR may remain triggered and be sent to a parent IAB node to indicate data that is expected to be received.

In some embodiments, transmission of an early BSR may not cancel other legacy triggered BSRs (e.g., triggered regular or legacy BSRs). In one embodiment, all BSRs triggered prior to a MAC PDU assembly may be cancelled if a MAC PDU is transmitted and this PDU includes no early BSR but a long or short BSR MAC CE that contains a buffer status up to (and including) a last event that triggered a BSR prior to the MAC PDU assembly.

In certain embodiments, a MAC entity of an IAB node may consider that UL-SCH resources available for a new transmission may meet LCP mapping restrictions configured for logical channels that triggered an early BSR. In such embodiments, the IAB node may not trigger a SR if an early BSR was triggered at the MAC entity of the IAB node and UL-SCH resources are available for a new transmission.

In various embodiments, a relative priority of an early BSR during LCP procedure may be the same as a regular BSR or a periodic BSR. Furthermore, in some embodiments, a periodic BSR timer may not be started if an early BSR is transmitted (e.g., a multiplexing and assembly procedure may be instructed to generate an early BSR MAC CE).

Figure 8:
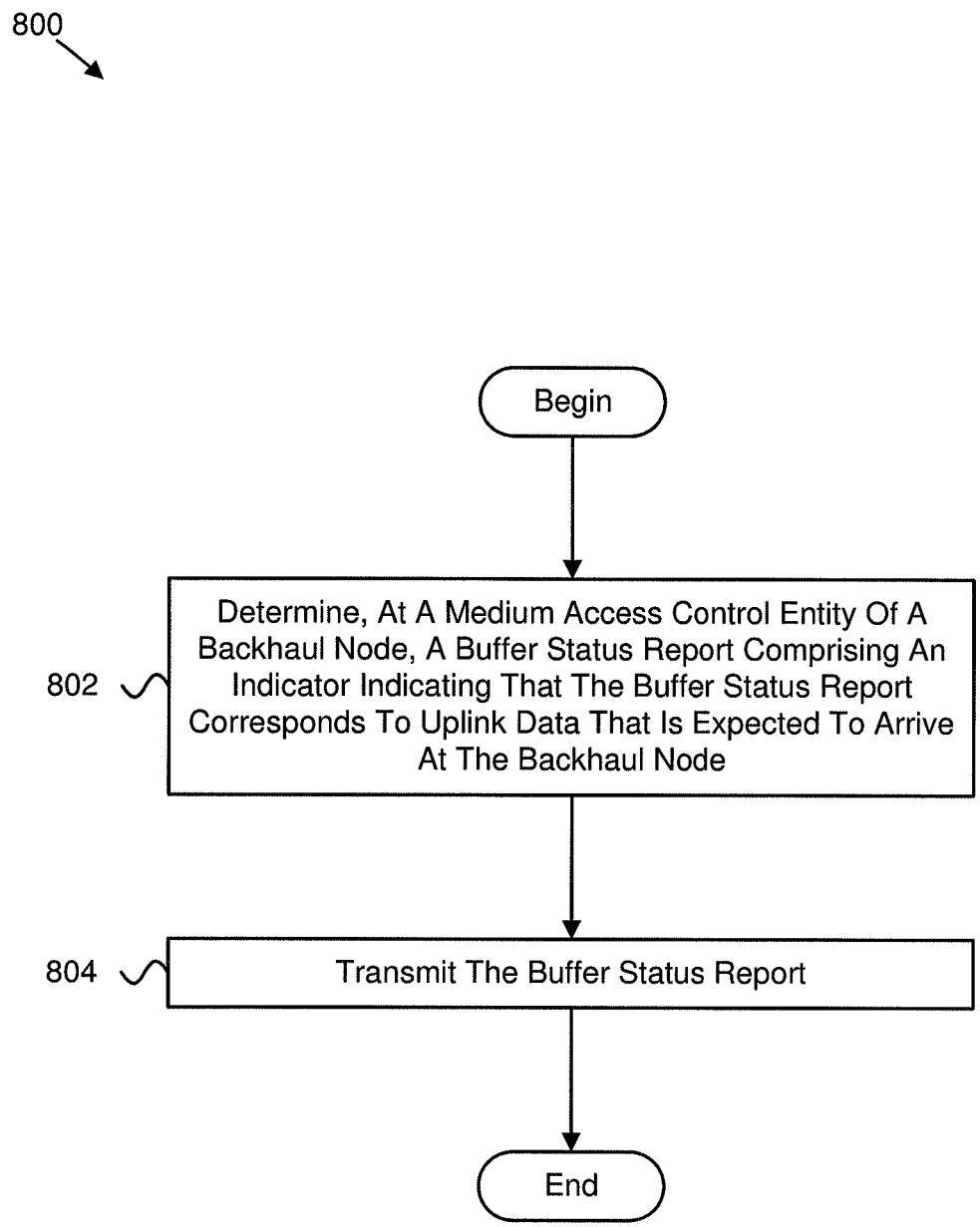
FIG. 8 is a schematic flow chart diagram illustrating one embodiment of a method for transmitting a buffer status report indicator.

FIG. 8 is a schematic flow chart diagram illustrating one embodiment of a method 800 for transmitting a buffer status report indicator. In some embodiments, the method 800 is performed by an apparatus, such as the network unit 104 (e.g., IAB node). In certain embodiments, the method 800 may be performed by a processor executing program code, for example, a microcontroller, a microprocessor, a CPU, a GPU, an auxiliary processing unit, a FPGA, or the like.

The method 800 may include determining 802, at a medium access control entity of a backhaul node, a buffer status report including an indicator indicating that the buffer status report corresponds to uplink data that is expected to arrive at the backhaul node. In certain embodiments, the method 800 includes transmitting 804 the buffer status report.

In certain embodiments, the method 800 comprises receiving control signaling indicating whether the medium access control entity of the backhaul node is enabled to transmit the buffer status report comprising the indicator indicating that the buffer status report corresponds to uplink data that is expected to arrive at the backhaul node. In some embodiments, the control signaling is part of a medium access control configuration. In various embodiments, the method 800 comprises determining whether the medium access control entity of the backhaul node is enabled to transmit the buffer status report comprising the indicator indicating that the buffer status report corresponds to uplink data that is expected to arrive at the backhaul node.

In one embodiment, the medium access control entity of the backhaul node is enabled to transmit the buffer status report in response to a logical channel to logical group mapping of the backhaul node matching the logical channel to logical group mapping of a child backhaul node and a parent backhaul node. In certain embodiments, the medium access control entity of the backhaul node is enabled to transmit the buffer status report in response to a bearer to backhaul channel mapping of the backhaul node matching the bearer to backhaul channel mapping of a child backhaul node and a parent backhaul node.

In some embodiments, the method 800 comprises triggering at the medium access control entity the buffer status report in response to receiving a prior buffer status report, wherein the prior buffer status report comprises an indicator indicating that the prior buffer status report corresponds to uplink data that is available for transmission. In various embodiments, the method 800 comprises determining a scheduling request configuration for a data transmission. In one embodiment, the scheduling request configuration corresponds to uplink transmission parameters.

In certain embodiments, the uplink transmission parameters comprise a numerology, a transmission duration, or a combination thereof. In some embodiments, the scheduling request configuration corresponds to a bandwidth part. In various embodiments, the method 800 comprises transmitting the scheduling request based on the scheduling request configuration.

In one embodiment, the scheduling request configuration corresponds to the buffer status report comprising an indicator indicating that the buffer status report corresponds to uplink data that is expected to arrive. In certain embodiments, the method 800 comprises determining a logical channel that triggers the buffer status report. In some embodiments, the logical channel is determined to be a highest priority logical channel among logical channels belonging to a logical channel group for which data is expected to be received at a time that the buffer status report is triggered.

In various embodiments, the method 800 comprises not canceling a triggered buffer status report indicating uplink data that is expected to arrive in response to uplink grants for a new transmission being available which are able to accommodate pending data available for transmission and the uplink grants being unable to accommodate a buffer status report medium access control control element plus a subheader for the medium access control control element.

In one embodiment, the method 800 comprises determining that uplink resources available for a new transmission meet logical channel prioritization mapping restrictions configured for logical channels that triggered the buffer status report. In certain embodiments, the medium access control entity of the backhaul node does not trigger a scheduling request for the buffer status report in response to the uplink resources being available for the new transmission.

Figure 9:
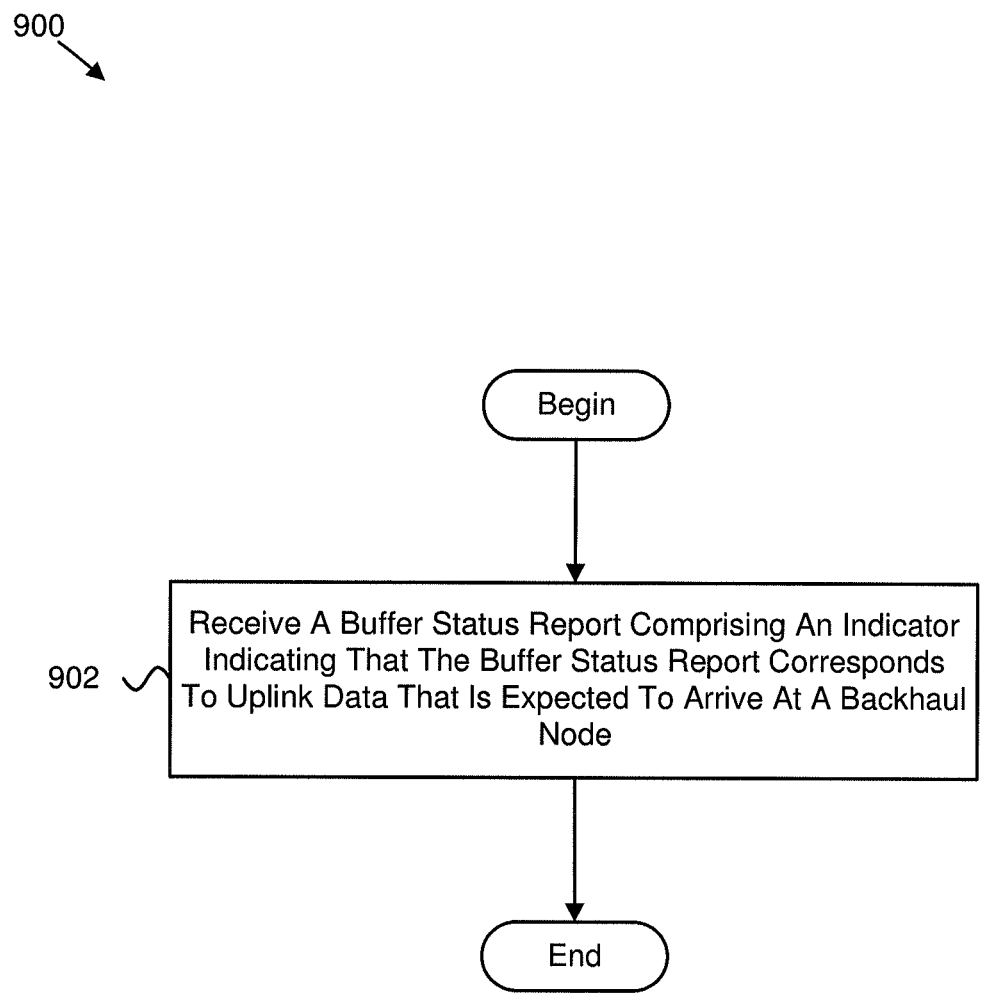
FIG. 9 is a schematic flow chart diagram illustrating one embodiment of a method for receiving a buffer status report indicator.

FIG. 9 is a schematic flow chart diagram illustrating one embodiment of a method 800 for receiving a buffer status report indicator. In some embodiments, the method 900 is performed by an apparatus, such as the network unit 104 (e.g., IAB node). In certain embodiments, the method 900 may be performed by a processor executing program code, for example, a microcontroller, a microprocessor, a CPU, a GPU, an auxiliary processing unit, a FPGA, or the like.

The method 900 may include receiving 902 a buffer status report including an indicator indicating that the buffer status report corresponds to uplink data that is expected to arrive at a backhaul node.

In certain embodiments, the method 900 comprises transmitting control signaling indicating whether a medium access control entity of the backhaul node is enabled to transmit the buffer status report comprising the indicator indicating that the buffer status report corresponds to uplink data that is expected to arrive at the backhaul node. In some embodiments, the control signaling is part of a medium access control configuration.

In one embodiment, a method comprises: determining, at a medium access control entity of a backhaul node, a buffer status report comprising an indicator indicating that the buffer status report corresponds to uplink data that is expected to arrive at the backhaul node; and transmitting the buffer status report.

In certain embodiments, the method comprises receiving control signaling indicating whether the medium access control entity of the backhaul node is enabled to transmit the buffer status report comprising the indicator indicating that the buffer status report corresponds to uplink data that is expected to arrive at the backhaul node.

In some embodiments, the control signaling is part of a medium access control configuration.

In various embodiments, the method comprises determining whether the medium access control entity of the backhaul node is enabled to transmit the buffer status report comprising the indicator indicating that the buffer status report corresponds to uplink data that is expected to arrive at the backhaul node.

In one embodiment, the medium access control entity of the backhaul node is enabled to transmit the buffer status report in response to a logical channel to logical group mapping of the backhaul node matching the logical channel to logical group mapping of a child backhaul node and a parent backhaul node.

In certain embodiments, the medium access control entity of the backhaul node is enabled to transmit the buffer status report in response to a bearer to backhaul channel mapping of the backhaul node matching the bearer to backhaul channel mapping of a child backhaul node and a parent backhaul node.

In some embodiments, the method comprises triggering at the medium access control entity the buffer status report in response to receiving a prior buffer status report, wherein the prior buffer status report comprises an indicator indicating that the prior buffer status report corresponds to uplink data that is available for transmission.

In various embodiments, the method comprises determining a scheduling request configuration for a data transmission.

In one embodiment, the scheduling request configuration corresponds to uplink transmission parameters.

In certain embodiments, the uplink transmission parameters comprise a numerology, a transmission duration, or a combination thereof.

In some embodiments, the scheduling request configuration corresponds to a bandwidth part.

In various embodiments, the method comprises transmitting the scheduling request based on the scheduling request configuration.

In one embodiment, the scheduling request configuration corresponds to the buffer status report comprising an indicator indicating that the buffer status report corresponds to uplink data that is expected to arrive.

In certain embodiments, the method comprises determining a logical channel that triggers the buffer status report.

In some embodiments, the logical channel is determined to be a highest priority logical channel among logical channels belonging to a logical channel group for which data is expected to be received at a time that the buffer status report is triggered.

In various embodiments, the method comprises not canceling a triggered buffer status report indicating uplink data that is expected to arrive in response to uplink grants for a new transmission being available which are able to accommodate pending data available for transmission and the uplink grants being unable to accommodate a buffer status report medium access control control element plus a subheader for the medium access control control element.

In one embodiment, the method comprises determining that uplink resources available for a new transmission meet logical channel prioritization mapping restrictions configured for logical channels that triggered the buffer status report.

In certain embodiments, the medium access control entity of the backhaul node does not trigger a scheduling request for the buffer status report in response to the uplink resources being available for the new transmission.

In one embodiment, an apparatus comprises: a processor of a medium access control entity that determines a buffer status report comprising an indicator indicating that the buffer status report corresponds to uplink data that is expected to arrive at the apparatus; and a transmitter that transmits the buffer status report.

In certain embodiments, the apparatus comprises a receiver that receives control signaling indicating whether the medium access control entity of the apparatus is enabled to transmit the buffer status report comprising the indicator indicating that the buffer status report corresponds to uplink data that is expected to arrive at the apparatus.

In some embodiments, the control signaling is part of a medium access control configuration.

In various embodiments, the processor determines whether the medium access control entity of the apparatus is enabled to transmit the buffer status report comprising the indicator indicating that the buffer status report corresponds to uplink data that is expected to arrive at the apparatus.

In one embodiment, the medium access control entity of the apparatus is enabled to transmit the buffer status report in response to a logical channel to logical group mapping of the apparatus matching the logical channel to logical group mapping of a child apparatus and a parent apparatus.

In certain embodiments, the medium access control entity of the apparatus is enabled to transmit the buffer status report in response to a bearer to backhaul channel mapping of the apparatus matching the bearer to backhaul channel mapping of a child apparatus and a parent apparatus.

In some embodiments, the processor triggers at the medium access control entity the buffer status report in response to receiving a prior buffer status report, and the prior buffer status report comprises an indicator indicating that the prior buffer status report corresponds to uplink data that is available for transmission.

In various embodiments, the processor determines a scheduling request configuration for a data transmission.

In one embodiment, the scheduling request configuration corresponds to uplink transmission parameters.

In certain embodiments, the uplink transmission parameters comprise a numerology, a transmission duration, or a combination thereof.

In some embodiments, the scheduling request configuration corresponds to a bandwidth part.

In various embodiments, the transmitter transmits the scheduling request based on the scheduling request configuration.

In one embodiment, the scheduling request configuration corresponds to the buffer status report comprising an indicator indicating that the buffer status report corresponds to uplink data that is expected to arrive.

In certain embodiments, the processor determines a logical channel that triggers the buffer status report.

In some embodiments, the logical channel is determined to be a highest priority logical channel among logical channels belonging to a logical channel group for which data is expected to be received at a time that the buffer status report is triggered.

In various embodiments, the processor does not cancel a triggered buffer status report indicating uplink data that is expected to arrive in response to uplink grants for a new transmission being available which are able to accommodate pending data available for transmission and the uplink grants being unable to accommodate a buffer status report medium access control control element plus a subheader for the medium access control control element.

In one embodiment, the processor determines that uplink resources available for a new transmission meet logical channel prioritization mapping restrictions configured for logical channels that triggered the buffer status report.

In certain embodiments, the medium access control entity of the apparatus does not trigger a scheduling request for the buffer status report in response to the uplink resources being available for the new transmission.

In one embodiment, a method comprises: receiving a buffer status report comprising an indicator indicating that the buffer status report corresponds to uplink data that is expected to arrive at a backhaul node.

In certain embodiments, the method comprises transmitting control signaling indicating whether a medium access control entity of the backhaul node is enabled to transmit the buffer status report comprising the indicator indicating that the buffer status report corresponds to uplink data that is expected to arrive at the backhaul node.

In some embodiments, the control signaling is part of a medium access control configuration.

In one embodiment, an apparatus comprises: a receiver that receives a buffer status report comprising an indicator indicating that the buffer status report corresponds to uplink data that is expected to arrive at a backhaul node.

In certain embodiments, the apparatus comprises a transmitter that transmits control signaling indicating whether a medium access control entity of the backhaul node is enabled to transmit the buffer status report comprising the indicator indicating that the buffer status report corresponds to uplink data that is expected to arrive at the backhaul node.

In some embodiments, the control signaling is part of a medium access control configuration.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a backhaul node, the method comprising: determining an amount of uplink data that is expected to arrive at the backhaul node but has not yet arrived at the backhaul node; determining, at a medium access control (MAC) entity of the backhaul node, a buffer status report comprising an indicator indicating that the buffer status report corresponds to the uplink data that is expected to arrive at the backhaul node but has not yet arrived at the backhaul node; transmitting the buffer status report to another node; and receiving control signaling indicating whether the MAC entity of the backhaul node is enabled to transmit the buffer status report comprising the indicator indicating that the buffer status report corresponds to uplink data that is expected to arrive at the backhaul node, wherein the control signaling is part of a MAC configuration.

2. The method of claim 1, further comprising determining whether the MAC entity of the backhaul node is enabled to transmit the buffer status report comprising the indicator indicating that the buffer status report corresponds to uplink data that is expected to arrive at the backhaul node.

3. The method of claim 2, wherein the MAC entity of the backhaul node is enabled to transmit the buffer status report in response to a logical channel to logical group mapping of the backhaul node matching the logical channel to logical group mapping of a child backhaul node and a parent backhaul node.

4. The method of claim 2, wherein the MAC entity of the backhaul node is enabled to transmit the buffer status report in response to a bearer to backhaul channel mapping of the backhaul node matching the bearer to backhaul channel mapping of a child backhaul node and a parent backhaul node.

5. The method of claim 1, further comprising not canceling a triggered buffer status report indicating uplink data that is expected to arrive in response to uplink grants for a new transmission being available which are able to accommodate pending data available for transmission and the uplink grants being unable to accommodate a buffer status report MAC control element plus a subheader for the MAC control element.

6. The method of claim 1, further comprising determining that uplink resources available for a new transmission meet logical channel prioritization mapping restrictions configured for logical channels that triggered the buffer status report.

7. The method of claim 6, wherein the MAC entity of the backhaul node does not trigger a scheduling request for the buffer status report in response to the uplink resources being available for the new transmission.

8. The method of claim 1, wherein the indicator indicating that the buffer status report corresponds to uplink data that is expected to arrive at the backhaul node is a logical channel identifier.

9. A medium access control (MAC) entity, comprising: at least one memory; and at least one processor coupled with the at least one memory and configured to cause the MAC entity to: determine an amount of uplink data that is expected to arrive at the MAC entity but has not yet arrived at the MAC entity; determine a buffer status report comprising an indicator indicating that the buffer status report corresponds to the uplink data that is expected to arrive at the MAC entity but has not yet arrived at the MAC entity; transmit the buffer status report to another node; and receive control signaling indicating whether the MAC entity is enabled to transmit the buffer status report comprising the indicator indicating that the buffer status report corresponds to uplink data that is expected to arrive at the MAC entity, wherein the control signaling is part of a MAC configuration.

10. The MAC entity of claim 9, wherein the at least one processor is configured to cause the MAC entity to not cancel a triggered buffer status report indicating uplink data that is expected to arrive in response to uplink grants for a new transmission being available which are able to accommodate pending data available for transmission and the uplink grants being unable to accommodate a buffer status report MAC control element plus a subheader for the MAC control element.

11. The MAC entity of claim 9, wherein the at least one processor is configured to cause the MAC entity to determine that uplink resources available for a new transmission meet logical channel prioritization mapping restrictions configured for logical channels that triggered the buffer status report.

12. The MAC entity of claim 11, wherein the at least one processor is configured to cause the MAC entity to not trigger a scheduling request for the buffer status report in response to the uplink resources being available for the new transmission.

13. A method performed by a node, the method comprising: receiving a buffer status report comprising an indicator indicating that the buffer status report corresponds to uplink data that is expected to arrive at a backhaul node but has not yet arrived at the backhaul node, wherein the buffer status report is determined based on an amount of uplink data that is expected to arrive at a backhaul node but has not yet arrived at the backhaul node; and transmitting control signaling indicating whether a medium access control (MAC) entity of the backhaul node is enabled to transmit the buffer status report comprising the indicator indicating that the buffer status report corresponds to uplink data that is expected to arrive at the backhaul node, wherein the control signaling is part of a MAC configuration.

14. A processor for wireless communication, comprising: at least one controller coupled with at least one memory and configured to cause the processor to: determining an amount of uplink data that is expected to arrive at the processor but has not yet arrived at the processor; determine a buffer status report comprising an indicator indicating that the buffer status report corresponds to the uplink data that is expected to arrive at the processor but has not yet arrived at the processor; transmit the buffer status report to another node; and receive control signaling indicating whether the processor is enabled to transmit the buffer status report comprising the indicator indicating that the buffer status report corresponds to uplink data that is expected to arrive at the processor, wherein the control signaling is part of a MAC configuration.

* * * * *